(12) United States Patent
Nakanishi et al.

(10) Patent No.: US 7,425,917 B2
(45) Date of Patent: Sep. 16, 2008

(54) RADAR FOR DETECTING THE VELOCITY OF A TARGET

(75) Inventors: Motoi Nakanishi, Nagaokakyo (JP); Toru Ishii, Hirakata (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/649,785

(22) Filed: Jan. 5, 2007

(65) Prior Publication Data
US 2007/0109176 A1 May 17, 2007

Related U.S. Application Data

(63) Continuation of application No. PCT/JP2005/010109, filed on Jun. 2, 2005.

(30) Foreign Application Priority Data
Aug. 10, 2004 (JP) .............................. 2004-233448

(51) Int. Cl.
*G01S 13/60* (2006.01)
*G01S 13/34* (2006.01)
*G01S 13/50* (2006.01)
*G01S 13/93* (2006.01)

(52) U.S. Cl. ..................... 342/115; 342/27; 342/28; 342/70; 342/104; 342/105; 342/107; 342/109; 342/114; 342/128; 342/175; 342/195; 342/196

(58) Field of Classification Search ............... 342/27, 342/28, 70–72, 104–117, 175, 195–197, 342/118, 128–133, 134–145; 701/300, 301
See application file for complete search history.

(56) References Cited

U.S. PATENT DOCUMENTS

| | | | | |
|---|---|---|---|---|
| 3,863,253 A | * | 1/1975 | Kiyoto et al. | 342/112 |
| 4,024,540 A | * | 5/1977 | Ofverberg | 342/128 |
| 4,225,950 A | * | 9/1980 | Kotera et al. | 342/70 |
| 5,806,019 A | * | 9/1998 | Ishiyama | 342/70 |
| 5,920,280 A | * | 7/1999 | Okada et al. | 342/109 |

(Continued)

FOREIGN PATENT DOCUMENTS

GB           2204757 A   * 11/1988

(Continued)

OTHER PUBLICATIONS

International Search Report from corresponding International application dated Aug. 30, 2005.

(Continued)

*Primary Examiner*—Bernarr E Gregory
(74) *Attorney, Agent, or Firm*—Dickstein, Shapiro, LLP.

(57) ABSTRACT

A radar including a target measurement component, a differential velocity calculator and an overall velocity determination portion. The target measurement component transmits and receives an electromagnetic wave over a detection range repeatedly at measurement intervals to measure a position of a target in the detection range and measure a Doppler velocity of the target based on a Doppler shift of the electromagnetic wave reflected from the target. The differential velocity calculator determines a differential velocity of the target based on a change in position of the target during consecutive measurement intervals. The overall velocity determination portion determines a current overall velocity by calculating a weighted average of the Doppler velocity, the differential velocity, and a previously determined overall velocity.

8 Claims, 10 Drawing Sheets

U.S. PATENT DOCUMENTS

| | | | | |
|---|---|---|---|---|
| 6,205,391 | B1* | 3/2001 | Ghoneim et al. | 342/70 |
| 6,369,748 | B1* | 4/2002 | Uehara | 342/70 |
| 6,664,920 | B1* | 12/2003 | Mott et al. | 342/129 |
| 6,741,204 | B2* | 5/2004 | Kumon et al. | 342/70 |
| 6,795,012 | B2* | 9/2004 | Nakanishi et al. | 342/70 |
| 6,844,843 | B2* | 1/2005 | Ishii et al. | 342/128 |
| 6,999,024 | B2* | 2/2006 | Kumon et al. | 342/70 |
| 2002/0180633 | A1* | 12/2002 | Nakanishi et al. | 342/70 |
| 2002/0190895 | A1* | 12/2002 | Nakanishi et al. | 342/70 |
| 2003/0179130 | A1* | 9/2003 | Kumon et al. | 342/70 |
| 2004/0108952 | A1* | 6/2004 | Ishii et al. | 342/70 |

FOREIGN PATENT DOCUMENTS

| | | |
|---|---|---|
| JP | 5-107076 | 4/1993 |
| JP | 05-223930 | 9/1993 |
| JP | 7-146358 | 6/1995 |
| JP | 2695086 | 9/1997 |
| JP | 2000-108718 | 4/2000 |
| JP | 2002-6040 | 1/2002 |
| JP | 2002-99907 | 4/2002 |

OTHER PUBLICATIONS

Written Opinion from corresponding International application dated Aug. 30, 2005.

* cited by examiner

RADAR FOR DETECTING THE VELOCITY OF A TARGET

CROSS REFERENCE TO RELATED APPLICATIONS

The present application is a continuation of International Application No. PCT/JP2005/010109, filed Jun. 2, 2005, which claims priority to Japanese Patent Application No. JP2004-233448, filed, Aug. 10, 2004, the entire contents of each of these applications being incorporated herein by reference in their entirety.

FIELD OF THE INVENTION

The present invention relates to a radar adapted to acquire detection information including velocity information of a target by transmitting and receiving a radio wave.

BACKGROUND OF THE INVENTION

In known in-vehicle radars, detection is performed over a detection range in front of a vehicle, and the position and the velocity of a target such as another vehicle existing in the detection range are measured. In FM-CW radars, a transmit signal is transmitted which alternately has an up modulation period in which frequency gradually increases and a down modulation period in which the frequency gradually decreases. If a reflected signal from a target is received, the position and the velocity of the target with respect to the position and the velocity of the vehicle are determined on the basis of a frequency spectrum of a beat signal due to the difference in frequency between the transmitted signal and the received signal.

In the FM-CW radars described above, the relative velocity (the "Doppler velocity") is measured on the basis of the frequency shift of the beat signal appearing in the frequency spectrum due to the Doppler effect, and the position of the target are determined every predetermined measurement interval and the moving velocity (the "differential velocity") of the target is determined from a change in the position. Each of these two types of velocity information has advantages and disadvantages, and use of only one of these two types of velocity information can cause a problem in the determination of the velocity.

For example, Patent Document 1 discloses a technique to determine whether Doppler velocity data is reliable enough, on the basis of differential velocity data. In this technique, if it is determined that the Doppler velocity data has an unreliable value, the Doppler velocity data is corrected using the differential velocity data. More specifically, when the Doppler velocity is greatly different from the differential velocity, the differential velocity is employed as the relative velocity of a target, while when the difference between the Doppler velocity and the differential velocity is small, the Doppler velocity is employed as the relative velocity of the target. Alternatively, when the difference between the Doppler velocity and the differential velocity is great, a value employed for an immediately previous relative velocity is employed as a current value of the relative velocity, while when the difference between the Doppler velocity and the differential velocity is small, the Doppler velocity is employed as the relative velocity of the target.

Patent Document 2 discloses a technique to obtain a high-accuracy relative velocity by correcting a velocity determined from a Doppler shift frequency on the basis of a differential velocity.

Patent Document 1: Japanese Examined Patent Application Publication No. 2695086
Patent Document 2: Japanese Unexamined Patent Application Publication No. 07-146358

If an abrupt change occurs in a reflection point on a reflection object such as a vehicle running ahead, the differential velocity becomes worse in accuracy than the Doppler velocity. In the method disclosed in Patent Document 1, a great error occurs in such a situation, because the differential velocity is employed when the difference between the Doppler velocity and the differential velocity is great. Besides, when there is a great difference between the Doppler velocity and the differential velocity, use of the previous relative velocity in determining the differential velocity causes the resultant differential velocity to have a great error compared with the Doppler velocity, if the target has great acceleration.

In the radar disclosed in Patent Document 2, when a target moves in a region close to a continuously extending reflection object such as a guard rail, a large error occurs in the Doppler velocity (and a large error can occur also in the differential velocity), and thus it is difficult to obtain accurate velocity information.

SUMMARY OF THE INVENTION

In view of the above, it is an object of the present invention to provide a radar which does not have the above-described problem and which is capable of detecting a high-accuracy relative velocity of a target.

To achieve the above-described object, the radar is configured as follows.

(1) A radar includes target measurement means for transmitting and receiving an electromagnetic wave over a particular detection range repeatedly every measurement interval to measure the position of a target in the detection range and measure the Doppler velocity of the target from the Doppler shift of the electromagnetic wave reflected from the target, differential velocity calculation means for determining the differential velocity of the target from a change in position of the target during the measurement interval determined by the target measurement means, and overall velocity determination means for determining a current overall velocity by calculating the weighted average of the Doppler velocity, the differential velocity, and a previous overall velocity.

(2) In the radar, the overall velocity determination means may set weighting factors for Doppler velocity and the differential velocity, depending on the difference between the Doppler velocity and the previous overall velocity and the difference between the differential velocity and the overall velocity.

(3) In the radar, the overall velocity determination means may set weighting factors for the Doppler velocity and the differential velocity such that the Doppler velocity and the differential velocity are compared with the previous the overall velocity, and velocity data having a smaller difference from the previous the overall velocity is assigned a greater weighting factor than a weighting factor assigned to the other velocity data having a greater difference from the previous the overall velocity.

(4) In the radar, the overall velocity determination means may set weighting factors such that, of the Doppler velocity, the differential velocity, and the previous overall velocity, two velocity data which are similar in value to each other are assigned a greater weighting factor than a weighting factor assigned to the remaining velocity data.

(5) In the radar described above, the radar may further include distance measurement means for measuring the distance to the target by a method other than the distance measurement method based on transmission and reception of an electromagnetic wave, wherein the differential velocity calculation means determines the differential velocity of the target from a change in the position of the target measured by the distance measurement means during the measurement interval.

(6) In the radar, the overall velocity determination means may determine acceleration from a change between the overall velocity obtained in an immediately previous measurement interval and the overall velocity obtained in a further previous measurement interval, and the overall velocity determination means may predict the velocity which will be obtained in a current measurement interval on the basis of the determined acceleration and employs the predicted velocity as the previous overall velocity.

(7) The radar may further include means for measuring the velocity or acceleration of a moving body which transmits and receives the electromagnetic wave, wherein the overall velocity determination means corrects an error of the overall velocity due to the change in the velocity of the moving body during the period from the previous measurement time to the current measurement time, on the basis of the acceleration of the moving body measured every measurement interval.

(8) The overall velocity determination means may determine whether the difference between any two of the Doppler velocity, the differential velocity, and the overall velocity is greater than a predetermined value, and if the difference is greater than the predetermined value, the overall velocity determination means outputs the previous overall velocity as the current overall velocity.

(1) By determining the current overall velocity on the basis of three types of velocity information, that is, the Doppler velocity, the differential velocity, and the previous overall velocity, it is possible to suppress the error component that randomly occurs due to noise or the like, and thus high accuracy can be achieved in the measurement of the relative velocity of the target.

(2) By setting the weighing factors for the Doppler velocity and the differential velocity depending on the difference of the Doppler velocity from the previous overall velocity and the difference of the differential velocity from the previous overall velocity, it is possible to apply a greater weighing factor to more reliable velocity information of the three types of velocity information, and thus high accuracy can be achieved in the measurement of the relative velocity.

(3) Of the Doppler velocity and the differential velocity, one having a smaller difference from the previous overall velocity is assigned a greater weighting factor so that more reliable velocity information is weighted more heavily to achieve high accuracy in the measurement of the relative velocity.

(4) By setting the weighing factors such that, of the Doppler velocity, the differential velocity, and the previous overall velocity, two of these which are similar in value are assigned a greater weighting factor, it is possible to achieve high accuracy in the measurement of the relative velocity without encountering a significant reduction in the measurement accuracy due to unreliable velocity information.

(5) By determining the differential velocity of the target from the change in position of the target during the measurement interval by using distance measurement means other than the distance measurement means based on the transmission and reception of the electromagnetic wave, it becomes possible to measure the distance to the same point on the reflection object (such as a rear reflector of another vehicle running ahead). This allows it to obtain a reliable measured differential velocity, and thus it is possible to accurately measure the relative velocity.

(6) By predicting the current velocity on the basis of the acceleration of the overall velocity and employing the predicted velocity as the "previous overall velocity", that is, by correcting the "previous overall velocity" taking into account the acceleration of the overall velocity, it is possible to achieve high accuracy in the measurement of the relative velocity even for a target moving with acceleration.

(7) By correcting an error of the "previous overall velocity" due to a change in the moving body (the user's vehicle) during a period from a previous measurement time and a current measurement time, on the basis of the acceleration of the moving body measured every measurement interval, it is possible to achieve high accuracy in the measurement of the relative velocity of the target even when the moving body (the user's vehicle) is moving with acceleration.

(8) When the difference between any two of the Doppler velocity, the differential velocity, and the overall velocity is greater than the predetermined value, the "previous overall velocity" is output as the "current overall velocity". This allows it to obtain a reliable measured relative velocity even when both the Doppler velocity and the differential velocity have a relatively large error.

REFERENCE NUMERALS 4 antenna
20 radar front end

DETAILED DESCRIPTION OF THE INVENTION

Radars according to respective first to seventh embodiments are described below with reference to FIGS. 1 to 4.

Figure 1:
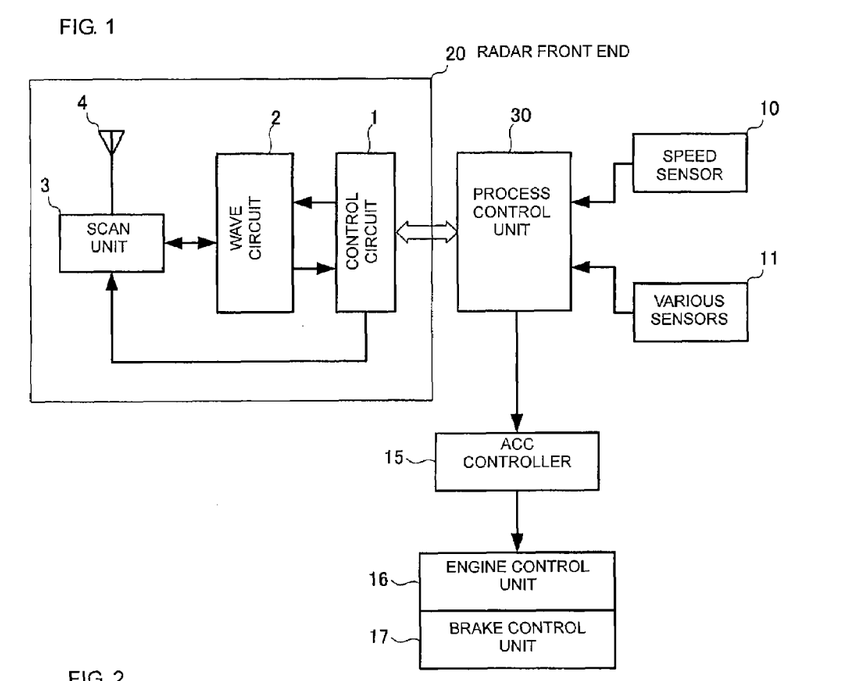
FIG. 1 is a block diagram showing a structure of a radar, which is used in common in all embodiments.

FIG. 1 is a block diagram showing a system including an in-vehicle radar and various units connected to the in-vehicle radar. In FIG. 1, reference numeral 20 denotes a radar front end including a control circuit 1, a millimeter wave circuit 2, a scanning unit 3, and an antenna 4. The millimeter wave circuit 2 modulates an oscillation frequency in accordance with a modulation signal given from the control circuit 1 and outputs a resultant transmit signal to the antenna 4 via the scanning unit 3. The millimeter wave circuit 2 also converts a received signal into an intermediate-frequency signal (IF signal) and supplies the resultant IF signal to the control circuit 1. The scanning unit 3 scans the beam direction of the antenna 4 over a predetermined range, for example, by periodically and mechanically moving the antenna 4 back and forth.

The control circuit 1 supplies a modulation signal to the millimeter wave circuit 2 and determines the distance and the velocity of a target on the basis of the IF signal supplied from the millimeter wave circuit 2. The control circuit 1 also supplies a control signal to the scanning unit 3 to direct the beam emitted from the antenna 4 into a particular azimuth direction thereby scanning the beam over the particular detection range. This makes it possible to determine the azimuth direction of the target.

A recognition process control unit 30 receives signals from a vehicle speed sensor 10 and other various sensors 11, and detects a status of the vehicle and a status of an environment including a road along which the vehicle is running. The recognition process control unit 30 supplies information associated with a target to an ACC controller 15.

The ACC controller 15 performs automatic cruising control on the basis of the information, given by the control circuit 1, associated with the position and the velocity of the target and on the basis of the vehicle speed determined by the vehicle speed sensor 11. More specifically, for example, the ACC controller 15 controls an engine control unit 16 and a brake control unit 17 so that the distance from a vehicle running immediately ahead is maintained constant. The ACC controller 15 also provides control data to prevent the vehicle from colliding with a target such as a vehicle existing ahead of the user's vehicle.

The engine control unit 16 and the brake control unit 17 control an engine and a brake in accordance with the control data given by the ACC controller 15.

Figure 2:
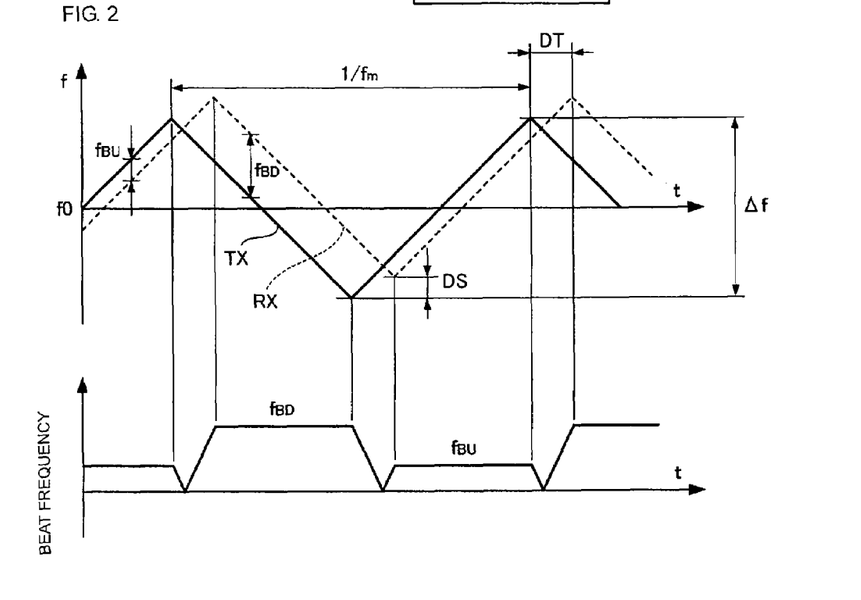
FIG. 2 shows an example of a change in frequency between a transmit signal and a receive signal and also shows an example of a change in frequency between an upbeat signal and a downbeat signal.

FIG. 2 shows a shift of the frequency of the receive signal from that of the transmit signal which occurs depending on the distance and the velocity of a target. In FIG. 2, $f_{BU}$ denotes an upbeat frequency which is equal to the frequency difference between the transmit signal TX and the receive signal RX during a period in which the frequency of the transmit signal TX increases, while $f_{BD}$ denotes a downbeat frequency which is equal to the frequency difference between the transmit signal TX and the receive signal RX during a period in which the frequency of the transmit signal TX decreases. Δf denotes a frequency swing. The shift in time (time difference DT) between the transmit signal TX in the form of a triangular wave and the receive signal RX corresponds to a time taken by the radio wave to make a round trip between the antenna and the target. DS denotes a Doppler shift in frequency between the transmit signal TX and the receive signal RX, which occurs depending on the relative velocity of the target with respect to the antenna. The upbeat frequency $f_{BU}$ and the downbeat frequency $f_{BD}$ vary depending on the time difference DT and the Doppler shift DS. Therefore, the distance from the radar to the target and the relative velocity of the target with respect to the radar can be calculated by detecting the upbeat frequency and the downbeat frequency.

Figure 3:
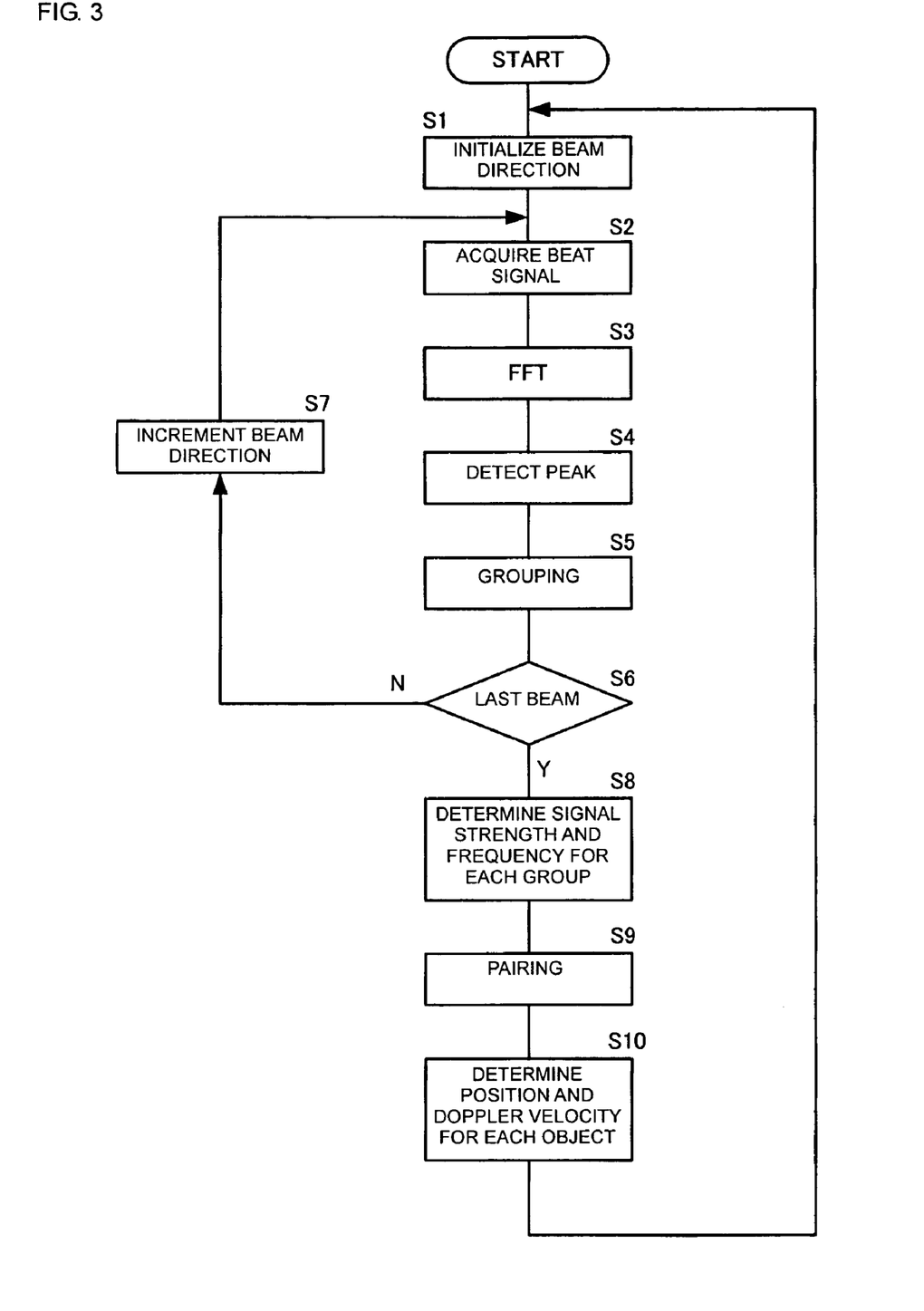
FIG. 3 is a flow chart showing a procedure for determining a position and a Doppler velocity for each target in a detection range.

FIG. 3 is a flow chart showing a process performed by the control circuit 1 in the radar front end 20 shown in FIG. 1. First, the beam is directed in an initial azimuth direction by controlling the scanning unit 3 (step S1). In this state, a predetermined number of sampled digital data of the beat signal determined by the millimeter wave circuit 2 are acquired and subjected to an FFT process (S2→S3).

Thereafter, peaks of the signal strength of a frequency spectrum are detected, and peak frequencies and signal strength at the respective peak frequencies are extracted (S4).

On the basis of the peak frequency and the signal strength thereof detected in the previous adjacent beam azimuth direction, a determination is made as to which group the peak frequency and the signal strength detected in the current beam azimuth direction should be classified (S5). That is, peak signals which are similar in peak frequency within a predetermined range are grouped together.

The beam azimuth direction is then changed by an amount corresponding to one beam width, and the above-described process is repeated (S6→S7→S2 and so on).

By performing the above-described process repeatedly until the beam azimuth direction reaches an end direction, the frequency spectrum is detected for each beam direction during the up modulation period and the down modulation period over the detection range with a particular width extending in an azimuth direction.

The signal strength and the frequency of each group are then determined (S8). For example, the center of beam azimuth directions of each group is employed as a representative azimuth direction, the center of frequencies at this azimuth direction is employed as a representative peak frequency, and the signal strength at the representative peak frequency is employed as the signal strength of the group.

On the basis of the peak frequency and the signal strength determined for each group of the upbeat signal and the downbeat signal, a group of the upbeat signal and a group of the downbeat signal regarded as coming from the same reflection object as that of the group of the upbeat signal are paired (S9).

The distance and the velocity of each target are determined from the sum and the difference of the peak frequencies of each pair of the upbeat signal and the downbeat signal (S10). Note that the velocity obtained herein is a Doppler velocity Vdop. The position of each target is determined in the form of polar coordinates given by the beam azimuth direction and the distance of the target. Alternatively, the position of each target may be represented in x-y rectangular coordinates obtained by converting the polar coordinates.

The "Doppler velocity", the "differential velocity", and the "overall velocity" are described below.

Doppler Velocity

The Doppler velocity Vdop is determined as follows.

$$\text{Vdop}=c\cdot fd/2fo \qquad (1)$$

where c: velocity of light fd: Doppler shift frequency fo: transmission frequency Differential Velocity The differential velocity Vdiff is determined as follows.

$$\text{Vdiff}=(dn-db)/T \qquad (2)$$

where dn: distance to a target obtained in a present measurement db: distance to a target obtained in a previous measurement T: measurement intervals at which steps S1 to S10 shown in FIG. 3 are performed repeatedly, that is, which the beam is scanned in the azimuth direction over the detection range once in each interval T.

Overall Velocity

The overall velocity refers to the relative velocity obtained this time by an overall determination on the basis of the relative velocity determined (output) in the previous measurement, and the Doppler velocity and the differential velocity described above.

FIRST EMBODIMENT

A radar according to a first embodiment is described below with reference to FIG. 4.

In this first embodiment, the Doppler velocity, the differential velocity, and the previous overall velocity are weighted by predetermined weighting factors, and the weighted average thereof is determined.

Figure 4:
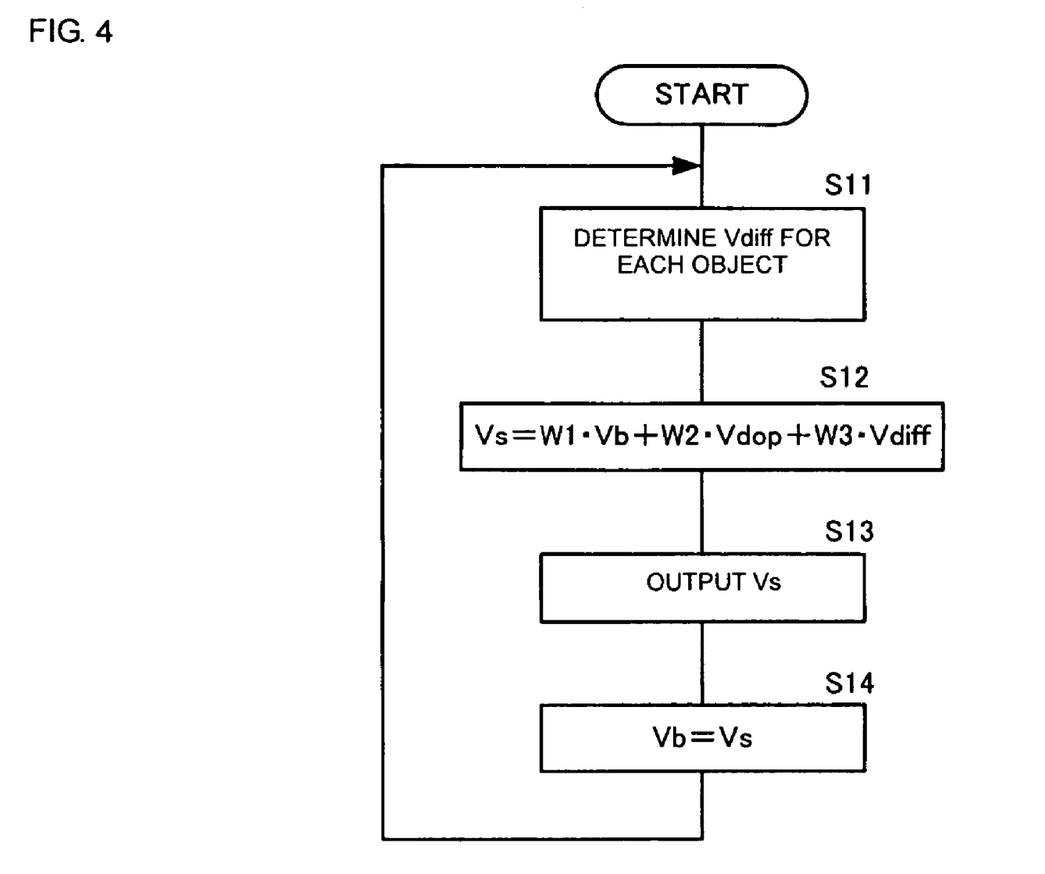
FIG. 4 is a flow chart showing a procedure of determining an overall velocity according to a first embodiment.

FIG. 4 is a flow chart showing a procedure of determining the weighted average. First, the differential velocity Vdiff is determined for each target (S11). The weighted average is then determined by weighting the previous overall velocity Vb by a weighting factor W1, the Doppler velocity Vdop by a weighting factor W2, and the differential velocity Vdiff by a weighting factor W3. The resultant weighted average is employed as a smoothed relative velocity Vs (S12). Note that in this step, W1, W2, and W3 are determined such that W1+W2+W3=1.

The smoothed relative velocity Vs is output as the current overall velocity, and is stored as a previous overall velocity Vb for use in a next measurement (S13→S14). The above-described process is performed repeatedly.

By determining the relative velocity Vs taking into account all three velocity data, it is possible to suppress a random error which occurs due to noise intruding into the Doppler velocity or the differential velocity, and thus it is possible to achieve high accuracy in the measurement of the relative velocity.

SECOND EMBODIMENT

Figure 5:
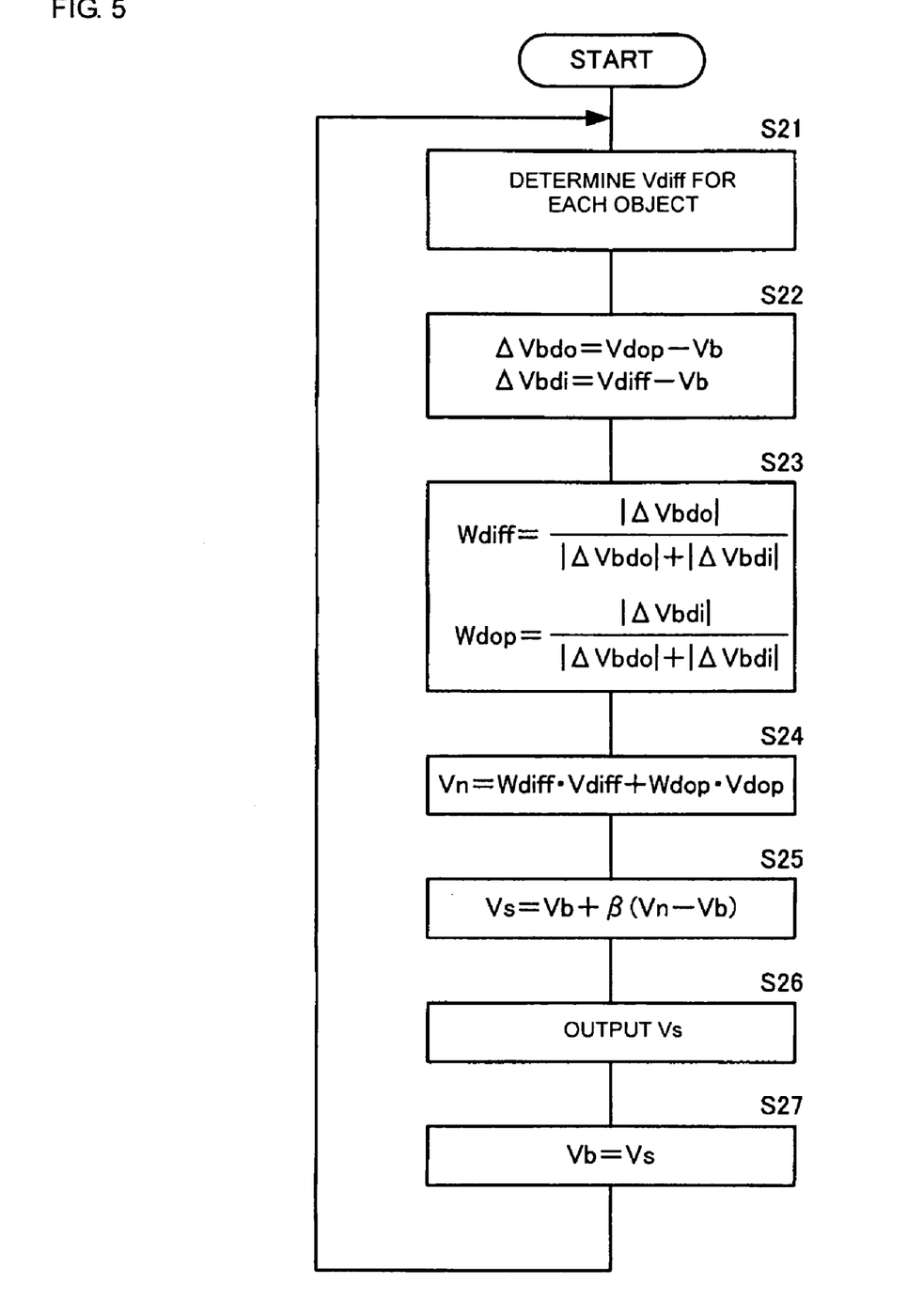
FIG. 5 is a flow chart showing a procedure of determining an overall velocity according to a second embodiment.

A radar according to a second embodiment is described below with reference to FIGS. 5 and 6.

In this second embodiment, the Doppler velocity, the differential velocity, and the previous overall velocity are weighted by weighting factors determined depending on the respective values thereof, and the weighted average thereof is determined. First, the differential velocity Vdiff is determined for each target (S21). The difference ΔVbdo between the Doppler velocity Vdop and the previous overall velocity Vb, and the difference ΔVbdi between the differential velocity Vdiff and the previous overall velocity Vb are determined. Furthermore, a weighting factor Wdiff for the differential velocity Vdiff and a weighting factor Wdop for the Doppler velocity Vdop are determined as described below (S22→S23).

The weighted average Vn of the differential velocity Vdiff and the Doppler velocity Vdop is calculated and the result is employed as a tentative value of the relative velocity (S24).

Furthermore, the weighted average of Vn and the overall velocity Vb is determined and the result is employed as a smoothed relative velocity Vs (S25). The resultant smoothed relative velocity Vs is output as a current relative velocity, and Vs is stored as Vb (S26→S27). The above-described process is performed repeatedly.

Figure 6:
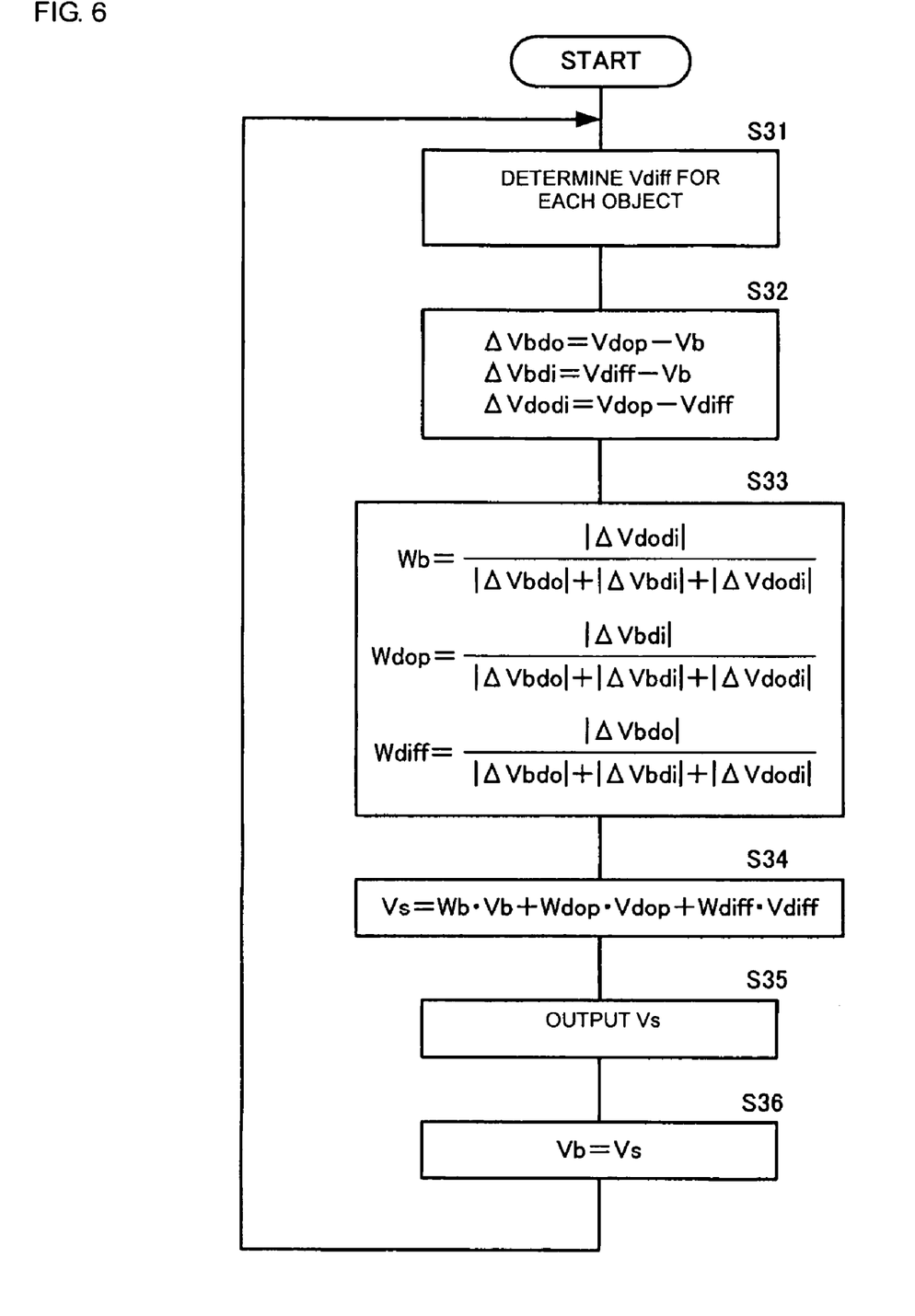
FIG. 6 is a flow chart showing another example of a procedure of determining an overall velocity according to the second embodiment.

FIG. 6 is a flow chart showing another example of a procedure. First, the differential velocity Vdiff is determined for each target (S31). The weighting factors Wb, Wdrop, and Wdiff are determined using the difference ΔVbdo between the Doppler velocity Vdop and the previous overall velocity Vb, the difference ΔVbdi between the differential velocity Vdiff and the previous overall velocity Vb, and the difference ΔVdodi between the Doppler velocity Vdop and the differential velocity Vdiff, as described below (S32→S33).

The previous overall velocity Vb, the Doppler velocity Vdop, and the differential velocity Vdiff are multiplied by the respective weighting factors, and the weighted average thereof is calculated. The result is employed as the relative velocity Vs (S34). This relative velocity Vs is output and stored as Vb (S35→S36). The above-described process is performed repeatedly.

By determining the weighted average of the three types of velocity data such that more reliable data is assigned a greater weighting factor, it is possible to further improve the measurement accuracy of the relative velocity.

THIRD EMBODIMENT

In this third embodiment described below, the Doppler velocity or the differential velocity is selected which has a smaller difference from the previous overall velocity, and the weighted average of the selected velocity and the previous overall velocity is calculated. The result is employed as a current overall velocity.

Figure 7:
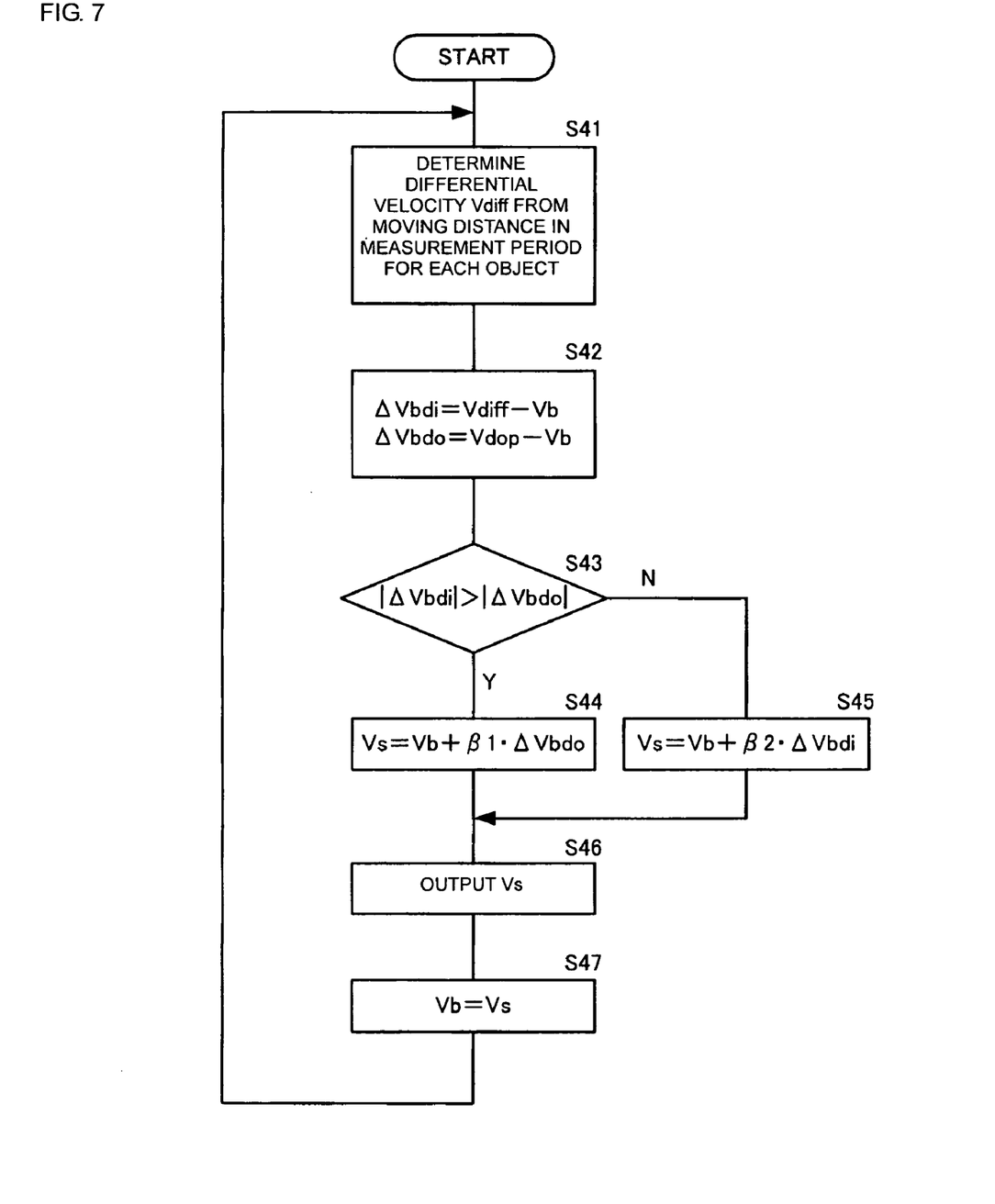
FIG. 7 is a flow chart showing a procedure of determining an overall velocity according to a third embodiment.

FIG. 7 is a flow chart showing a procedure of determining the weighted average.

First, the differential velocity Vdiff is determined for each target, from the length of the measurement interval and the moving distance in the measurement interval (S41).

Thereafter, the difference ΔVbdi between the differential velocity Vdiff and the previous overall velocity Vb, and the difference ΔVbdo between the Doppler velocity Vdop and the previous overall velocity Vb are determined (S42). The absolute value of ΔVbdi is compared with the absolute value of ΔVbdo. If the absolute value of ΔVbdi is greater than the absolute value of ΔVbdo, the weighted average of the previous overall velocity Vb and the Doppler velocity Vdop is calculated and the result is employed as a smoothed overall velocity Vs (S43→S44). On the other hand, if the absolute value of ΔVbdo is greater than the absolute value of ΔVbdi, the weighted average of the previous overall velocity Vb and the differential velocity Vdiff is calculated and the result is employed as a smoothed overall velocity Vs (S43→S45).

The calculation in step S44 is performed according to the following equation:

$$Vs=(1-\beta 1)Vb+\beta 1 Vdop \quad (3)$$

That is, in the calculation of the weighted average, the previous overall velocity Vb is multiplied by a weighing factor $(1-\beta 1)$, and the Doppler velocity Vdop is multiplied by a weighting factor $\beta 1$.

Similarly, the calculation in step S45 is performed according to the following equation:

$$Vs=(1-\beta 2)Vb+\beta 2 Vdiff \quad (4)$$

That is, in the calculation of the weighted average, the previous overall velocity Vb is multiplied by a weighing factor $(1-\beta 2)$, and the differential velocity Vdiff is multiplied by a weighting factor $\beta 2$.

$\beta 1$ and $\beta 2$ are filtering factors ($0<\beta 1<1$ and $0<\beta 2<1$). With increasing $\beta 1$, the Doppler velocity obtained in the current measurement has a greater contribution to the smoothed velocity Vs, and thus the smoothed velocity Vs has higher responsivity. On the other hand, with increasing β2, the differential velocity obtained in the current measurement has a greater contribution to the smoothed velocity Vs, and thus the smoothed velocity Vs has higher responsivity.

Note that in the present embodiment, a smaller one of Δbdo and Δbdi is assigned a weighting factor of 0.

The resultant smoothed velocity Vs is output as a current overall velocity (S46), and the value of Vs is stored as Vb for use in a next measurement (S47). The above-described process is performed repeatedly once in each measurement interval.

Specific examples of factors that can cause a reduction in the measurement accuracy of the "Doppler velocity" or the "differential velocity" are described below.

(1) In an environment in which there are many objects along a roadside (as in a case in which a vehicle immediately in front of the user's vehicle is running close to a guard rail), reflected signals from the objects along the roadside cause the shape of the spectrum of the beat signal from the target (the vehicle running in front of the user's vehicle) to be deformed, and a fluctuation occurs in the peak frequency thereof. This can make it difficult to obtain an accurate Doppler shift frequency. In such a situation, an error can also occur in the distance. The errors in both Doppler velocity and the differential velocity cause a great reduction in the measurement accuracy of the velocity.

If the modulation frequency is increased (that is, if the modulation period is decreased) or the frequency is shifted by a greater amount, the component of the beat frequency corresponding to the distance becomes greater (that is, the beat frequency changes more greatly in response to a change in the distance). However, no change occurs in the Doppler shift frequency. This means that the Doppler velocity has a greater influence than the differential velocity has. Therefore, when the modulation frequency and the magnitude of the frequency shift are set such that a change in the peak frequency has a greater influence on the Doppler velocity than on the differential velocity, the Doppler velocity has a greater error in the environment in which there are many objects along the roadside.

(2) In a case in which a reflection object has a rather large size as is the case with vehicles, the center reflection position can change when the relative position of the reflection object changes with respect to the user's vehicle position. This can cause the measured distance to have a discontinuous change. Thus, the differential velocity does not give an accurate relative velocity.

In view of the above, in the third embodiment, as shown in FIG. 7, when velocity data is greatly different from the overall velocity obtained in the immediately previous measurement, this velocity data is regarded as having a great error, and the Doppler velocity or the differential velocity is selected which is closer to the overall velocity obtained in the previous measurement and the selected velocity data is used to calculate the current overall velocity.

Thus, even if an error caused by (1) or (2) occurs in the Doppler velocity or the differential velocity, it is possible to obtain high accuracy in the measurement of the relative velocity.

FOURTH EMBODIMENT

Now, a procedure of determining the relative velocity by the radar according to a fourth embodiment is described below with reference to FIG. 8.

Figure 8:
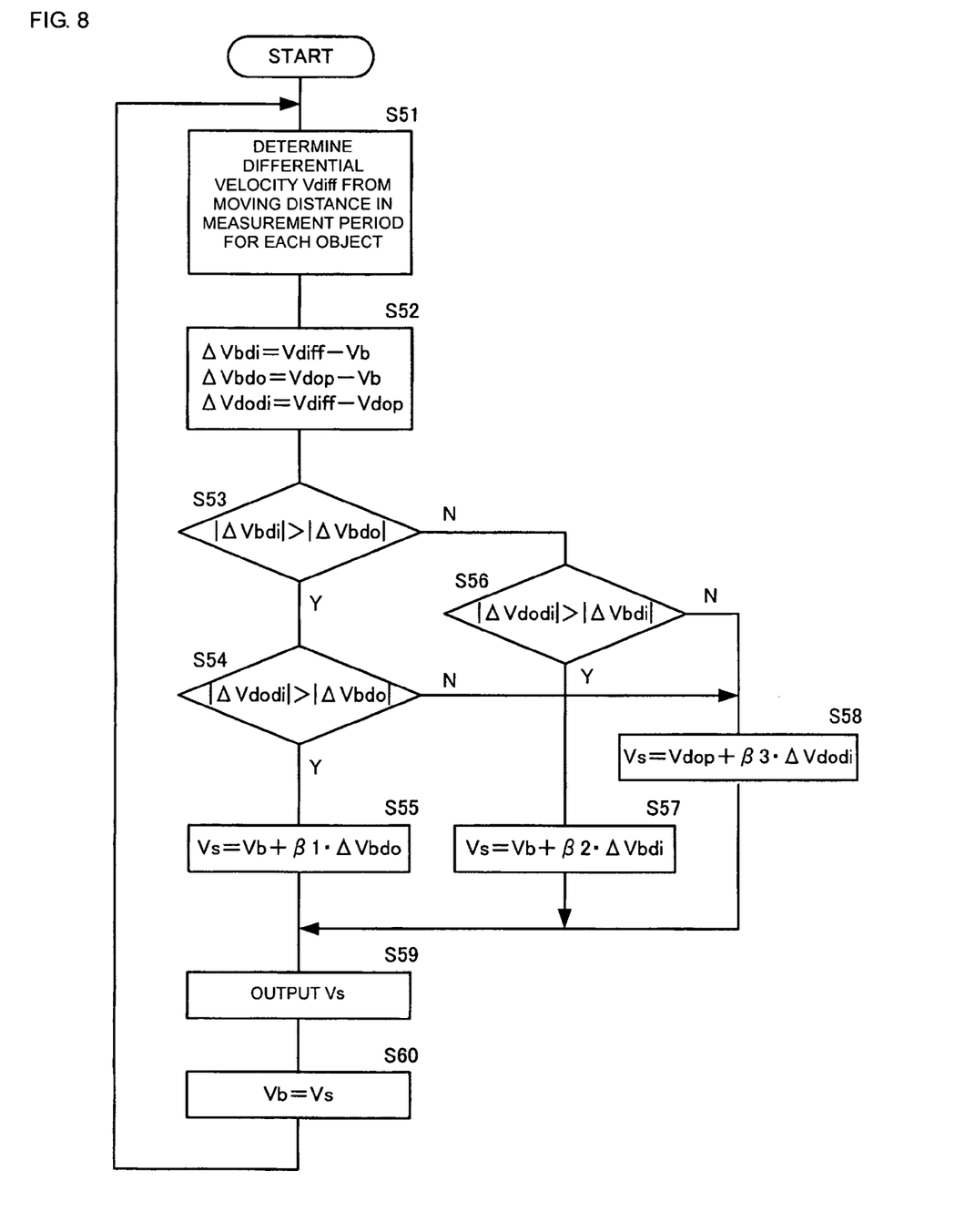
FIG. 8 is a flow chart showing a procedure of determining an overall velocity according to a fourth embodiment.

FIG. 8 is a flow chart showing a processes performed by the control circuit 1 shown in FIG. 1. In this fourth embodiment, of the three velocity data, the "Doppler velocity", the "differential velocity", and the "previous overall velocity", two velocity data which are similar in value to each other are weighted by a greater value than the remaining velocity data in the calculation of the weighted average value.

First, the differential velocity Vdiff is determined for each target, from the moving distance during the measurement interval (S51). ΔVbdi and ΔVbdo are then determined in a similar manner to step S42 shown in FIG. 7. Furthermore, the difference ΔVdodi between the differential velocity Vdiff and the Doppler velocity Vdop is determined (S52). The absolute value of ΔVbdi and the absolute value of ΔVbdo are compared with each other, and the absolute value of ΔVdodi and the absolute value of ΔVbdo are compared with each other. Of the three difference values, if the difference ΔVbdo between the Doppler velocity Vdop and the previous overall velocity Vb is the smallest, then the weighted average of the Doppler velocity Vdop and the previous overall velocity Vb is employed as the smoothed velocity Vs (S53→S54→S55) On the other hand, when the difference Δ Vbdi between the differential velocity Vdiff and the previous overall velocity Vb is the smallest, the weighted average of the differential velocity Vdiff and the previous overall velocity Vb is employed as the smoothed velocity Vs (S56→S57). In a case in which the difference ΔVdodi between the differential velocity Vdiff and the Doppler velocity Vdop is the smallest, the weighted average of the differential velocity Vdiff and the Doppler velocity Vdop is employed as the smoothed velocity Vs (S58).

Note that in the present embodiment, velocities other than those having the smallest difference are assigned a weighting factor of 0.

The smoothed velocity Vs determined in the above-described manner is output as the current overall velocity and the value of Vs is stored Vb for use as a previous overall velocity in a next measurement (S59→S60).

By using the weighted average of two reliable velocity data without using unreliable data as described above, it is possible to obtain high accuracy in the measurement of the relative velocity without having a significant error due to unreliable data.

If detection failures occur in successive measurements for a target moving with acceleration or deceleration, the "previous overall velocity" gradually deviates from the actual velocity. In this case, when a differential velocity and a Doppler velocity are detected successfully, the overall velocity is determined by calculating the weighted average of the differential velocity and the Doppler velocity.

FIFTH EMBODIMENT

A radar according to a fifth embodiment is described below with reference to FIG. 9.

Figure 9:
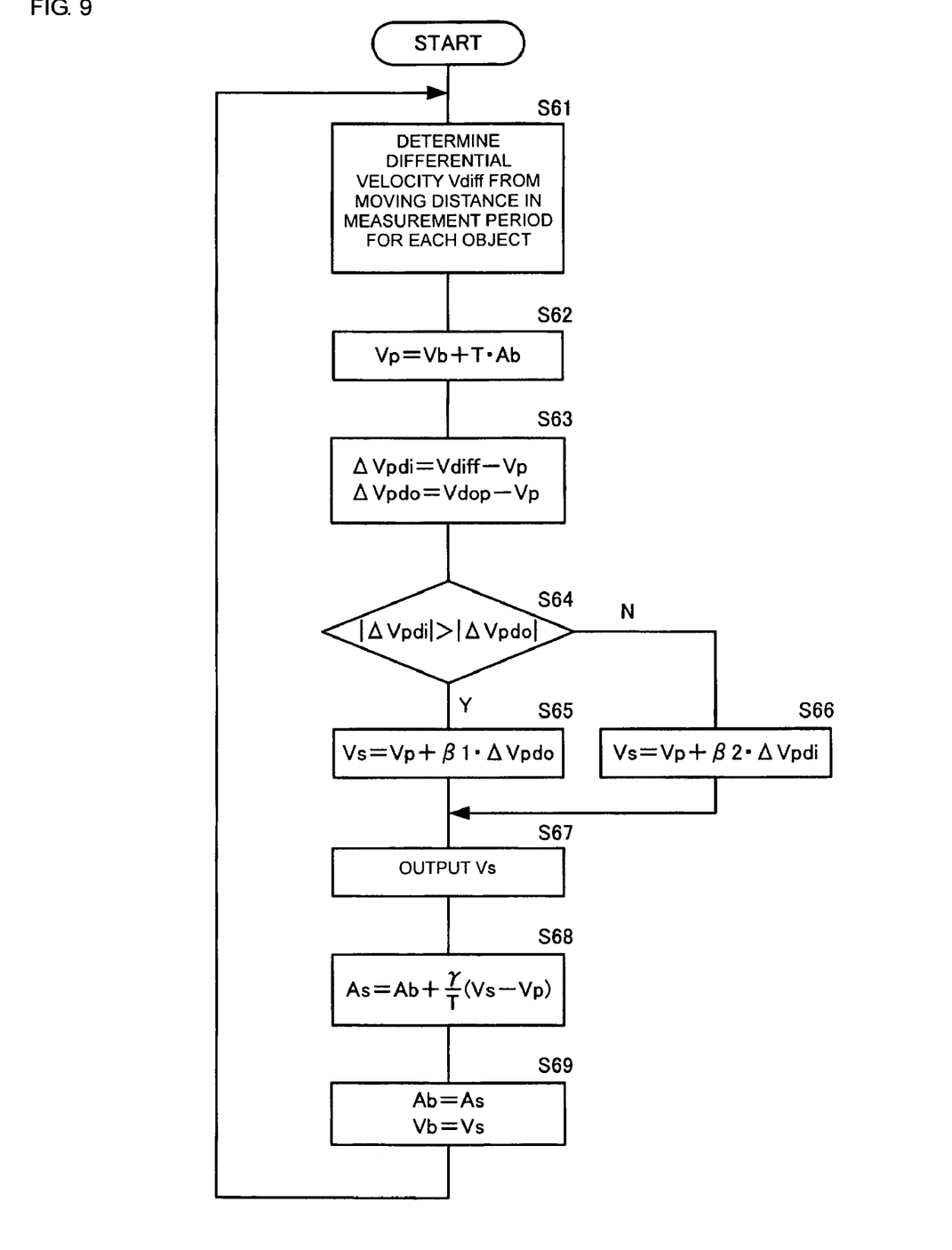
FIG. 9 is a flow chart showing a procedure of determining an overall velocity according to a fifth embodiment.

FIG. 9 is a flow chart showing a process performed by the control circuit 1 shown in FIG. 1.

In this fifth embodiment, acceleration is determined from the difference between an overall velocity obtained in a previous measurement interval and the overall velocity obtained in a further previous measurement interval. The overall velocity which will be obtained in a current measurement interval is predicted on the basis of the determined acceleration, and the predicted overall velocity is employed as the previous overall velocity. In this fifth embodiment, as in the third embodiment described above, the Doppler velocity and the differential velocity are compared with the previous overall velocity, and the weighted average of the overall velocity and the velocity determined as being closer to the overall velocity is calculated.

As shown in FIG. 9, the differential velocity Vdiff is determined for each target, from the moving distance during the measurement interval (S61). The predicted value Vp of the relative velocity which will be obtained in the current measurement interval is calculated according to the following equation:

$$Vp = Vb + T \cdot Ab \quad (5)$$

Where Vb is the previous overall velocity, T is the measurement interval, and Ab is the acceleration determined in the previous measurement interval.

The difference ΔVpdi between the differential velocity Vdiff and the predicted current relative velocity Vp determined on the basis of the acceleration is determined. Similarly, the difference ΔVpdo between the Doppler velocity Vdop and Vp is determined (S63).

The absolute values of ΔVpdi and ΔVpdo are compared with each other. If the absolute value of ΔVpdi is greater than the absolute value of ΔVpdo, the weighted average of the Doppler velocity Vdop and the predicted current relative velocity Vp is employed as the smoothed overall velocity Vs (S64→S65). On the other hand, if the absolute value of ΔVpdo is greater than the absolute value of ΔVpdi, the weighted average of the differential velocity Vdiff and the predicted current relative velocity Vp is employed as the smoothed overall velocity Vs (S64→S66).

The resultant smoothed velocity Vs determined in the above-described manner is output as the current overall velocity (S67).

After the smoothed velocity is determined, the relative acceleration As in the current measurement is determined according to the following equation (S68).

$$As = Ab + \gamma(Vs - Vp)/T \quad (6)$$

where γ is the filtering factor used in the smoothing (0<γ<1).

For use in the next measurement, As is then stored as Ab, and Vs is stored as Vb (S69). The above-described process is performed repeatedly.

As described above, even when a target is moving with acceleration, it is possible to accurately measure the relative velocity of the target.

SIXTH EMBODIMENT

Now, a radar according to a sixth embodiment is described below with reference to FIG. 10.

In this sixth embodiment, an error of a measured relative velocity is corrected taking into account the acceleration of the moving body (the user's vehicle) on which the radar is installed.

Figure 10:
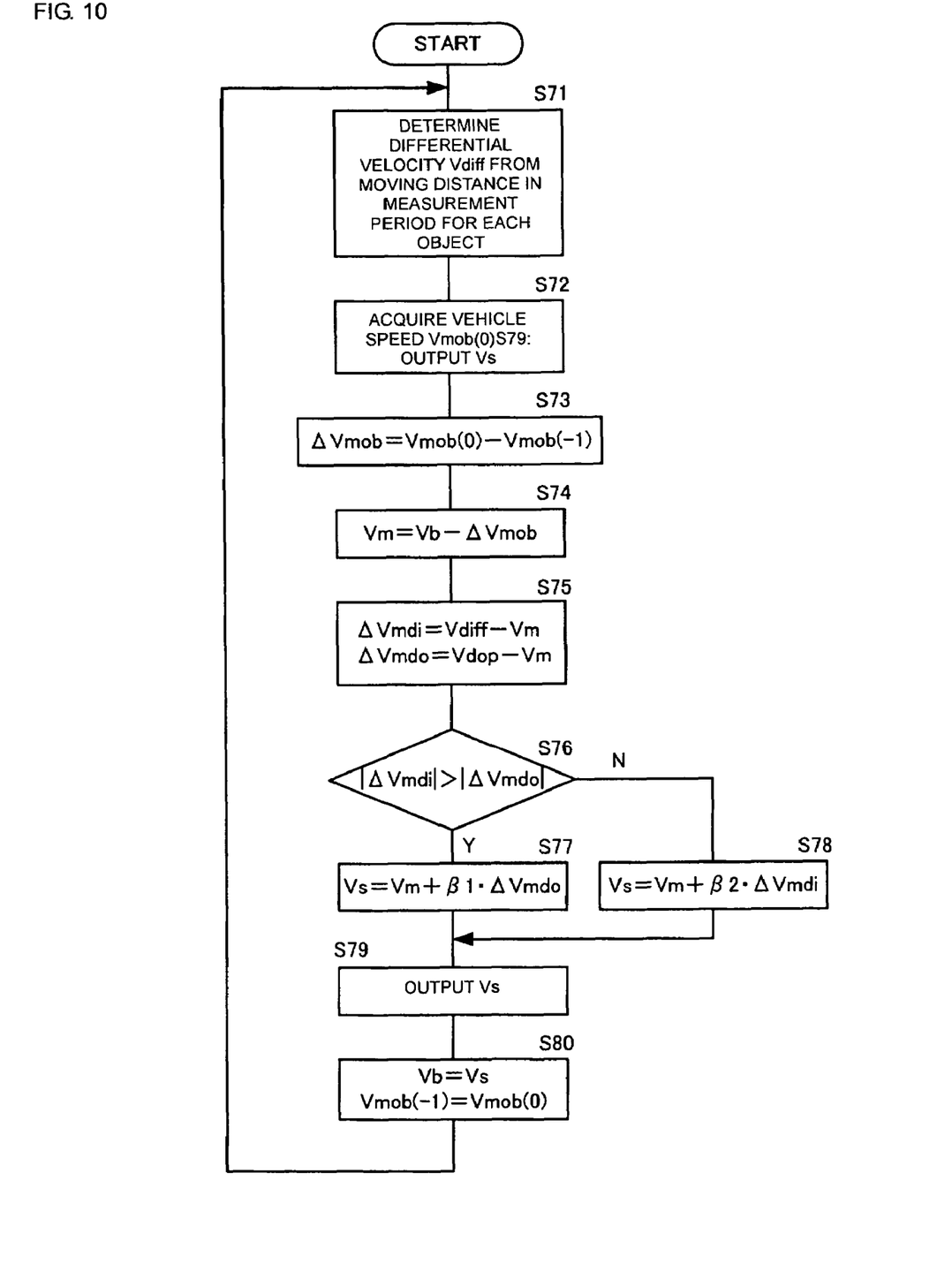
FIG. 10 is a flow chart showing a procedure of determining an overall velocity according to a sixth embodiment.

FIG. 10 is a flow chart showing a process performed by the control circuit 1 shown in FIG. 1. First, the differential velocity Vdiff is determined for each target (S71). The velocity Vmob of the user's vehicle is detected using a vehicle speed sensor such as a vehicle velocity pulse sensor (S72). The difference ΔVmob between the vehicle velocity Vmob(0) obtained in the current measurement and the vehicle velocity Vmob(-1) obtained in the previous measurement is determined (S73). The difference ΔVmob of the vehicle speed is then subtracted from the previous overall velocity Vb to correct the error of the overall velocity Vb due to the acceleration of the user's vehicle thereby obtaining the corrected previous overall velocity Vm (S74).

The difference ΔVmdi between the differential velocity Vdiff and the corrected previous overall velocity Vm. Similarly, the difference ΔVmdo between the Doppler velocity Vdop and Vm is determined (S75).

The absolute values of ΔVmdi and ΔVmdo are compared with each other. If the absolute value of ΔVmdi is greater than the absolute value of ΔVmdo, the weighted average of the corrected previous overall velocity Vm and the Doppler velocity Vdop is calculated and the result is employed as a smoothed overall velocity Vs (S76→S77). On the other hand, if the absolute value of ΔVmdo is greater than the absolute value of ΔVmdi, the weighted average of the corrected previous overall velocity Vm and the differential velocity Vdiff is calculated and the result is employed as a smoothed overall velocity Vs (S76→S78).

The resultant smoothed velocity Vs determined in the above-described manner is output as the current overall velocity (S79).

The vehicle speed Vmob(0) obtained in the current measurement is stored as a previous vehicle speed Vmob(-1) for use in a next measurement (S80).

SEVENTH EMBODIMENT

Now, a radar according to a seventh embodiment is described below with reference to FIG. 11.

In this seventh embodiment, when the difference between two of the "Doppler velocity", the "differential velocity", and the "previous overall velocity" is greater than a predetermined threshold value for any combination of two velocity data, the previous overall velocity is directly output as the current measurement result. On the other hand, when the difference is not greater than the predetermined threshold value for all combinations, the weighted average of two velocity data is calculated and the result is employed as the relative velocity, in a similar manner to the first embodiment described above.

Figure 11:
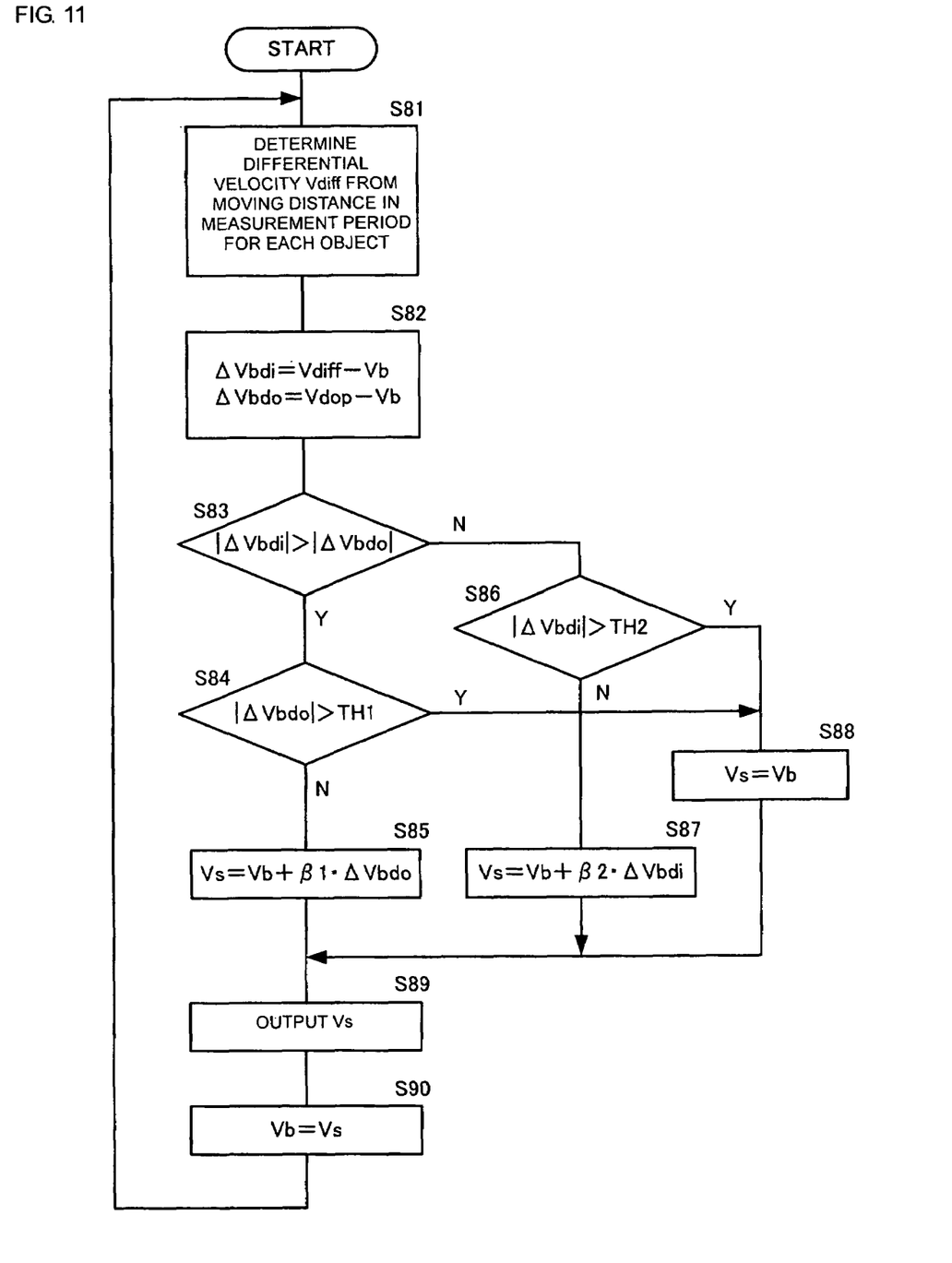
FIG. 11 is a flow chart showing a procedure of determining an overall velocity according to a seventh embodiment.

First, as shown in FIG. 11, the differential velocity Vdiff is determined for each target, from the moving distance during the measurement interval (S81). ΔVbdi and ΔVbdo are then determined in a similar manner to step S42 shown in FIG. 7 (S82). When the absolute value of ΔVbdi and the absolute value of ΔVbdo are both greater than a threshold value TH1, the previous overall velocity Vb is employed as the smoothed velocity Vs, that is, the current overall velocity (S83→S84→S88). When the absolute value of ΔVbdi and the absolute value of ΔVbdo are both greater than a threshold value TH2, the previous overall velocity Vb is employed as the smoothed velocity Vs (S83→S86→S88).

In a case in which the absolute value of ΔVbdo is equal to or smaller than the absolute value of ΔVbdi and is equal to or smaller than the threshold value TH1, the weighted average of the Doppler velocity Vdop and the previous overall velocity Vb is employed as the smoothed velocity Vs (S85). In a case in which the absolute value of ΔVbdi is equal to or smaller than the absolute value of ΔVbdo and is equal to or smaller than the threshold value TH2, the weighted average of the differential velocity Vdiff and the previous overall velocity Vb is employed as the smoothed velocity Vs (S87).

The smoothed velocity Vs determined in the above-described manner is output, and Vs is stored as the "previous overall velocity Vb" for use in a next measurement (S89→S90).

When any of the "Doppler velocity", the "differential velocity", and the "previous overall velocity" is greatly different from any other two velocity values, it is highly likely that the differential velocity and the Doppler velocity obtained in the current measurement are both greatly different from the actual values. When the measurement interval is set to be short enough, the relative velocity of the target does not change greatly during the measurement interval. For example, for in-vehicle radars, according to A.3.2 of Appendix A of JISD0802, a maximum measured value of deceleration in an occurrence of an emergency brake was 7.9 m/s². Therefore, when the relative velocity is measured at intervals of 0.1 seconds, the maximum change in the relative velocity during one measurement interval is 0.79 m/second (=2.8 km/hour).

When the peak frequency of the frequency spectrum is changed by an object present on a roadside or for other reasons, the Doppler velocity and the differential velocity both have a large error. In this case, the previous overall velocity (or the predicted current relative velocity calculated taking into account the acceleration according to the fifth or sixth embodiment described above) can be regarded as closest to the true relative velocity. Thus, the previous overall velocity (or the predicted current relative velocity) is output as the current measurement result. This allows it to maintain high accuracy in the present and following measurements.

Eighth Embodiment

In the embodiments described above, the differential velocity is determined from a change in position of a target during the measurement interval by using a distance measurement function of a radar. In contrast, in an eighth embodiment described below, the differential velocity is determined on the basis of distance data determined using distance measurement means other than the radar.

In radars using a radio wave such as a millimeter wave, the center reflection point at which the radio wave is reflected varies from moment to moment depending on a change in position of a reflection object (a vehicle other than the user's vehicle). Thus, the differential velocity can have a detection error due to the change in the center reflection point.

To solve the above problem, an infrared radar, a stereoscopic camera, an ultrasonic sonar, or the like may be used in conjunction with the in-car radar. In particular, use of the infrared radar in conjunction with the in-car radar provides a great advantage in that because the distance measurement relies on reflection from a high-reflection point such as a rear reflector or the like of a vehicle running ahead of the user's vehicle, the position of the reflection point of the reflection object the distance to which is being measured is maintained constant. This allows it to stably achieve high accuracy in the measurement of the differential velocity. When the stereoscopic camera is used, the distance is measured on the basis of the shape of a target such as a vehicle running ahead. Because the attitude of the target does not change quickly, use of the stereoscopic camera also allows it to achieve high accuracy in the measurement of the differential velocity.

However, there is a possibility that the differential velocity measured by the above-described method has an error due to a bad weather condition such as fog, rain, snow or the like, or due to an influence of other light sources such as sunlight. A detection failure of a target can also cause an error of the differential velocity. In the worse case, measurement can become impossible. When the stereoscopic camera is used, if the resolution of the camera is low, there is a possibility that the measurement accuracy is not high enough to determine the differential velocity for targets at distant locations. In such a case, high-accuracy measurement of the relative velocity can be achieved by employing not the differential velocity measured by the auxiliary measurement means but the differential velocity measured by the main radio wave radar. The reduction in reliability of the measurement of the differential velocity by the auxiliary measurement means may be automatically detected, and the determination may be automatically made as to which differential velocity should be used.

The invention claimed is:

1. A radar comprising:
   a target measurement component that transmits and receives an electromagnetic wave over a detection area repeatedly at measurement intervals to measure a position of a target in the detection area and measure a Doppler velocity of the target based on a Doppler shift of the electromagnetic wave reflected from the target;
   a differential velocity calculator that determines a differential velocity of the target based on a change in position of the target during consecutive measurement intervals; and
   an current velocity determination portion that determines a current velocity of the target in a measurement interval by calculating a weighted average of the Doppler velocity, the differential velocity, and a previously determined velocity from a prior measurement interval.

2. The radar according to claim 1, wherein the current velocity determination portion sets weighting factors for the Doppler velocity and the differential velocity, the weighting factors depending on a difference between the Doppler velocity and the previously determined velocity and a difference between the differential velocity and the current velocity.

3. The radar according to claim 1, wherein the current velocity determination portion sets weighting factors for the Doppler velocity and the differential velocity such that the Doppler velocity and the differential velocity are compared with the previously determined velocity, and velocity data having a smaller difference from the previously determined velocity is assigned a greater weighting factor than a weighting factor assigned to other velocity data having a greater difference from the previously determined velocity.

4. The radar according to claim 1, wherein the current velocity determination portion sets weighting factors such that, of the Doppler velocity, the differential velocity, and the previously determined velocity, two velocity data which are similar in value to each other are assigned a greater weighting factor than a weighting factor assigned to remaining velocity data.

5. The radar according claim 1, further comprising a distance measurement component that measures a distance to the target,
   wherein the differential velocity calculator determines the differential velocity of the target based on a change in the position of the target measured by the distance measurement component during the measurement intervals.

6. The radar according to claim 1, wherein the current velocity determination portion determines acceleration based on a change between a first velocity obtained in first measurement interval of the measurement intervals and a second velocity obtained in a second measurement interval prior to the first measurement interval, and the current velocity determination portion predicts a velocity which will be obtained in a third measurement interval subsequent to the first measurement interval on the basis of the determined acceleration and employs the predicted velocity as the previously determined velocity.

7. The radar according to claim 1, further comprising a velocity measurement component that measures velocity or acceleration of a moving body which receives and transmits the electromagnetic wave, wherein the current velocity determination portion corrects an error of the current velocity due to the change in the velocity of the moving body between consecutive measurement intervals based on the acceleration of the moving body measured during each measurement interval.

8. The radar according to claim 1, wherein the current velocity determination portion determines whether the difference between any two of the Doppler velocity, the differential velocity, and the current velocity is greater than a predetermined value, and if the difference is greater than the predetermined value, the current velocity determination portion outputs the previously determined velocity as the current velocity.

* * * * *